United States Patent
Schilling et al.

(10) Patent No.: US 7,018,955 B2
(45) Date of Patent: Mar. 28, 2006

(54) DRILLING FLUID, APPARATUS, AND METHOD

(75) Inventors: Kevin H. Schilling, Muscatine, IA (US); Michael Riley, Muscatine, IA (US); Roger E. McPherson, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 387 days.

(21) Appl. No.: 10/342,800

(22) Filed: Jan. 15, 2003

(65) Prior Publication Data

US 2003/0176293 A1 Sep. 18, 2003

Related U.S. Application Data

(63) Continuation-in-part of application No. 09/941,099, filed on Aug. 28, 2001, now Pat. No. 6,518,223, which is a continuation-in-part of application No. 09/638,564, filed on Aug. 14, 2000, now abandoned.

(51) Int. Cl.
*C09K 7/02* (2006.01)

(52) U.S. Cl. .................. 507/104; 507/110; 507/112; 507/113

(58) Field of Classification Search ................ 507/104, 507/110, 112, 113
See application file for complete search history.

(56) References Cited

U.S. PATENT DOCUMENTS

| | | | |
|---|---|---|---|
| 2,271,696 A | 2/1942 | Jones | |
| 2,771,138 A | 11/1956 | Beeson | |
| 2,807,570 A | 9/1957 | Updegraff | |
| 2,986,213 A | 5/1961 | Fox | |
| 3,738,437 A | 6/1973 | Scheuerman | |
| 4,038,481 A | 7/1977 | Antrim et al. | |
| 4,142,595 A | 3/1979 | Anderson et al. | |
| 4,447,341 A | 5/1984 | Block | |
| 4,502,969 A | 3/1985 | Shell | |
| 4,526,693 A | 7/1985 | Son et al. | |
| 4,629,575 A * | 12/1986 | Weibel | 507/214 |
| 4,634,538 A | 1/1987 | Alexander | |
| 4,743,384 A | 5/1988 | Lu et al. | |
| 4,757,862 A | 7/1988 | Naiman et al. | |
| 4,963,273 A | 10/1990 | Perricone et al. | |
| 4,988,450 A | 1/1991 | Wingrave et al. | |
| 5,110,484 A | 5/1992 | Sheu et al. | |
| 5,198,415 A | 3/1993 | Steiger | |
| 5,208,216 A | 5/1993 | Williamson | |
| 5,211,250 A | 5/1993 | Kubena, Jr. et al. | |
| 5,385,640 A * | 1/1995 | Weibel et al. | 162/23 |
| 5,403,820 A | 4/1995 | Walker | |
| 5,479,987 A | 1/1996 | Hale | |

(Continued)

FOREIGN PATENT DOCUMENTS

DE 19714166 10/1998

(Continued)

OTHER PUBLICATIONS

Wurzburg, M.S., *Modified Starches: Properties and Uses,* CRC Press, Inc., 187-188, Boca Raton, Florida.

(Continued)

*Primary Examiner*—Philip C. Tucker
(74) *Attorney, Agent, or Firm*—Banner & Witcoff, Ltd.

(57) ABSTRACT

Disclosed are drilling fluids that include carboxyalkylated corn hulls in an amount effective to inhibit fluid loss from a wellbore formation. The carboxyalkylated corn hulls are heat stable and surprisingly effective at inhibiting fluid loss. Also disclosed are a drilling apparatus and a drilling process.

43 Claims, 1 Drawing Sheet

U.S. PATENT DOCUMENTS

| | | |
|---|---|---|
| 5,494,120 A | 2/1996 | Hale et al. |
| 5,593,952 A | 1/1997 | Jarrett |
| 5,602,082 A | 2/1997 | Hale et al. |
| 5,607,904 A | 3/1997 | Jarrett |
| 5,635,458 A | 6/1997 | Lee et al. |
| 5,684,075 A | 11/1997 | Patel et al. |
| 5,686,396 A | 11/1997 | Hale et al. |
| 5,693,698 A | 12/1997 | Patel et al. |
| 5,710,107 A | 1/1998 | Walker |
| 5,925,598 A | 7/1999 | Mody et al. |
| 6,054,416 A | 4/2000 | Bland |
| 6,247,543 B1 | 6/2001 | Patel et al. |
| 6,248,698 B1 | 6/2001 | Mullen et al. |
| 6,602,994 B1* | 8/2003 | Cash et al. ............ 536/30 |
| 6,806,231 B1* | 10/2004 | Schilling et al. ............ 507/104 |
| 2002/0123432 A1 | 9/2002 | Schilling et al. |
| 2003/0199396 A1* | 10/2003 | Schilling et al. ............ 507/100 |
| 2003/0199398 A1 | 10/2003 | Schilling et al. |
| 2004/0124013 A1* | 7/2004 | Wiesner et al. ............ 175/65 |

FOREIGN PATENT DOCUMENTS

| | | |
|---|---|---|
| EP | 0134084 A1 | 3/1985 |
| EP | 0175412 A2 | 3/1986 |
| GB | 2365896 | 2/2003 |
| GB | 2380502 | 4/2003 |
| WO | WO 91/05832 | 5/1991 |
| WO | WO 97/19145 | 5/1997 |
| WO | WO 00/43465 | 7/2000 |
| WO | WO03020844 | 3/2003 |

OTHER PUBLICATIONS

International Search Report mailed Apr. 12, 2002.

* cited by examiner

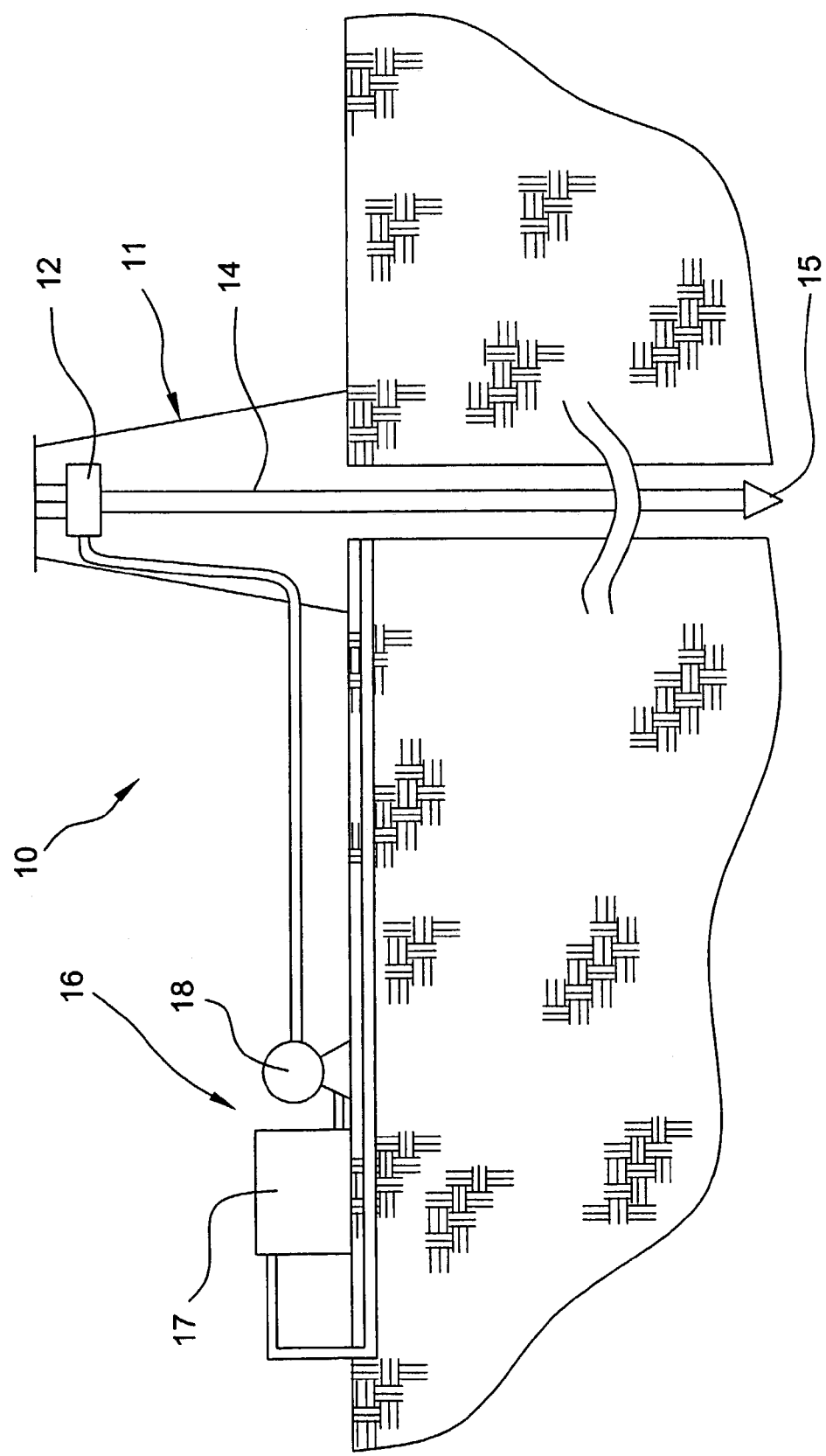

DRILLING FLUID, APPARATUS, AND METHOD

RELATED APPLICATIONS

This application is a continuation-in-part of prior application Ser. No. 09/941,099, filed Aug. 28, 2001, now U.S. Pat. No. 6,518,223, which in turn was a continuation-in-part of prior application Ser. No. 09/638,564, filed Aug. 14, 2000, now abandoned. Related subject matter is disclosed in PCT application No. PCT/US02/27419, filed Aug. 28, 2002, published as WO 03/020844, and in provisional application 60/406,604, filed Aug. 28, 2002. The entire contents of each prior application are hereby incorporated by reference in their entireties. It is contemplated that the ingredients disclosed in the prior patent applications may in some embodiments be combined with ingredients disclosed in the present application in a drilling fluid.

TECHNICAL FIELD OF THE INVENTION

The invention is in the area of drilling fluids used in connection with drilling wells, such as oil wells and water wells. The invention is also directed towards a drilling apparatus and process.

BACKGROUND OF THE INVENTION

In drilling a well or other similar borehole, a drill bit is operatively coupled, usually by a drill string, to a drive which rotates the drill bit to cause the drill bit to bore into the earth. A drilling fluid, or drilling mud, is circulated through the borehole annulus. The drilling fluid passes through the drilling string and to the surface through the drill bit for cooling and lubricating the drill bit and for carrying rock cuttings generated by the cutting action of the bit to the surface. The drilling fluid may be a gas, but more typically is a liquid. Other types of drilling fluids are "drill-in" fluids, which are pumped through the drill pipe while drilling through the payzone, and "completion fluids," which are pumped down a well after drilling has been completed.

Many liquids suitable for use as drilling fluids are known. Some drilling fluids are oil-based. Such oil-based fluids suffer from a number of drawbacks, particularly, their adverse effects on the environment. Oil-based fluids also can be costly to purchase and to dispose of.

Other drilling fluids are water-based or constitute an emulsion of oil in water or water in oil. Such fluids often are inexpensive compared to oil-based fluids, and are less costly to dispose of. Water-based fluids also pose less of a risk to the environment than do oil-based fluids. One drawback associated with water-based fluids is that the water in the fluid tends to promote borehole instability, particularly when shale is encountered in the drilling process. The water-based fluid may adsorb and absorb into pores in the shale, thus causing the shale to swell and thereby tending to cause the borehole to collapse.

One function of the drilling fluid is to provide hydrostatic pressure to counter the inward pressure exerted by the rock wellbore formation. Because the outward pressure of the drilling fluid generally is greater than the inward pressure of the rock formation, loss of the drilling fluid to the wellbore formation is common. As the fluid is lost to the wellbore, a filter cake composed of suspended and/or precipitated components of the drilling fluid typically builds up along the circumference of the borehole. This filter cake generally is undesirable. The filter cake cause "differential sticking" and other difficulties. In addition, the loss of fluid requires addition of more fluid, which can increase costs.

In recognition of the fluid loss problem, the prior art has provided numerous fluid loss control agents. Among such agents are lignites, chromium compounds, such as ferrochrome lignosulfonates, carboxymethyl cellulose, and starches, such as corn, potato, and tapioca starch. Starches used in prior art drilling fluids are sometimes derivatized, crosslinked, or otherwise modified to impart desired properties, such as viscosity and temperature stability.

The non-natural ingredients that heretofore have been used as fluid loss control agents are expensive and of potential environmental concern. The invention seeks to provide a natural fluid loss control agent that is comparable in properties to other known naturally derived fluid loss control agents.

THE INVENTION

It has now been found that carboxyalkylated agricultural residues that include hemicellulose and cellulose are highly effective as fluid loss control agents. In particular, carboxyalkylated corn hulls are highly suitable as a fluid loss control agent. Carboxyalkylated corn hulls include carboxyalkyl cellulose, which is known in the art to provide fluid loss properties. Surprisingly, however, hemicellulose and possibly other components of the carboxyalkylated corn hulls are believed to enhance the effectiveness of carboxyalkyl cellulose in providing such properties. This phenomenon is believed heretofore to have been unexpected.

In accordance with the invention, the carboxyalkylated corn hulls are is present in a drilling fluid in an amount effective to inhibit fluid loss from a wellbore formation. The product may be used alone in a liquid base as a drilling fluid, but preferably is combined with one or more other materials, such as an alkyl glycoside, molasses solids, a maltodextrin, hemicellulose, or, more generally, any other suitable material. In practice, the drilling fluid will contain numerous other ingredients. Also provided by the invention are a drilling process and an apparatus.

The drilling fluid of the preferred embodiments of the invention is surprisingly heat stable. It is contemplated that the fluid loss control properties of the invention are particularly useful when the fluid has been exposed to elevated temperatures. In preferred embodiments of the invention, the drilling fluid is circulated through a drill string under circumstances where the drilling fluid will be exposed to elevated temperatures. Other features of the preferred embodiments of the invention are discussed hereinbelow and are set forth in the pending claims.

BRIEF DESCRIPTION OF THE DRAWING

The FIGURE is a schematic representation of an oil well drilling apparatus.

DESCRIPTION OF THE PREFERRED EMBODIMENTS

In this document, the term "drilling fluid" signifies any fluid used in drilling operations. The term "drilling mud" signifies generally specifically a mud used while drilling a borehole into the earth, and the term "completion fluid" signifies a fluid used during well completion operations. It is contemplated that the drilling fluid may take he form of a drilling mud or a completion fluid and may be used in drilling and/or completion operations respectively.

The preferred embodiments of the invention make use of carboxyalkylated corn hulls. The invention is more generally contemplated to be applicable to other agricultural residues that contain hemicellulose and cellulose, preferably low-lignin agriculture residues such as wheat bran, but potentially including such residues as stover and straw. By "agricultural residue" is contemplated any residue of an agriculturally grown material after processing of such material (for instance, to obtain other fractions of the material). The preferred embodiments will be hereafter described in connection with corn hulls, but it should be understood that other residues as heretofore described in conjunction with the invention.

The drilling fluid of the invention generally comprises a liquid base and carboxyalkylated corn hulls, optionally in conjunction with other ingredients. The liquid base used in the drilling fluid of the invention comprises water, a water-miscible liquid, or a mixture of a water-miscible liquid with water. If the liquid base includes water, the water may be provided from any suitable source. For example, when the oil drilling apparatus is off-shore or near the ocean, sea water is the preferred liquid base inasmuch as it is freely available. The water may also comprise treated water, softened water, tap water, natural or artificial brine, or other suitable water source. The water miscible liquid may be glycerine, polyglycerine, a polyether, a polyol, or other suitable water miscible liquid. The liquid base may be present in any amount suitable to carry, dissolve and/or suspend the components of the drilling fluid. Preferably, the liquid base is present in the drilling fluid in a total amount ranging from about 5 to about 7.5, more preferably, about 5.5 to about 6 lbs./gallon. It is further contemplated that the liquid base may be used in an oil-based system that comprises an emulsion of oil in water or water in oil.

In accordance with the preferred embodiments of the invention, the drilling fluid includes carboxyalkylated corn hulls, which are present in the drilling fluid in an amount effective to inhibit fluid loss into a wellbore formation. Generally, corn hulls are composed of a mixture of cellulose, hemicellulose, and other components. Carboxyalkylated corn hulls are corn hulls that have been subjected to a carboxyalkylation reaction, whereby at least the cellulose and hemicellulose components of the corn hulls have been derivatized by substitution of some of the hydroxyl groups on the cellulose backbone with carboxyalkyl groups. The carboxyalkylated corn hulls may be provided in dry form or in aqueous or other solution. Carboxyalkylated corn hulls are surprisingly heat stable, and are particularly suitable for use in connection with wellbore drilling operations. Any suitable corn may be used as the source of the corn hulls. By "carboxyalkylated corn hulls" is further contemplated any fraction of the carboxyalkylated corn hulls that includes hemicellulosics and cellulosics and that is effective as a fluid loss control agent, and including either destarched or non-destarched corn hulls.

The carboxyalkylated corn hulls preferably are provided as the alkaline catalyzed reaction product of a chloroester, such as sodium chloracetate, with corn hulls. The carboxyalkylated corn hulls preferably are selected from among carboxymethyl, carboxyethyl, carboxypropyl, and carboxybutyl corn hulls, and most preferably comprise the alkaline-catalyzed reaction product of sodium chloroacetate and corn hulls, which product contains carboxymethyl cellulose, carboxymethyl hemicellulose and other components. The reaction is preferably accomplished in an extruder, wherein sufficient heat and work are applied to the reactants to derivatize the cellulose and hemicellulose present in the corn hulls to the extent desired. The corn hulls may be substituted to any suitable degree of substitution, preferably a carboxyl content ranging from 2–4% on the cellulose and hemicellulose backbones.

The carboxyalkylated corn hulls may be used in the drilling fluid in any suitable amount. Preferably, the carboxyalkylated corn hulls are present in the drilling fluid in an amount ranging 0.5 to 10 lb/barrel (42 gal U.S.), more preferably from 2–4 lb/barrel, based on the dry carboxyalkylated corn hull solids. More generally, the carboxyalkylated corn hulls may be present in an amount effective to inhibit fluid loss in a wellbore formation. The fluid loss control agent should be deemed to be present in an amount effective to inhibit fluid loss into a wellbore formation if the agent is present in these amounts. More generally, the American Petroleum Institutes' Recommended Practice 13B-1 may be used to evaluate fluid loss properties.

The drilling fluid of the invention in one embodiment further includes an alkyl glycoside. As disclosed in pending provisional application 60/406,604, sorbitol may be used in lieu of or in addition to an alkyl glycoside. Alkyl glycosides are a known class of industrial chemicals and are formed by the substitution of the hemiacetal hydroxyl group of a lower order saccharide (i.e., a polysaccharide having a degree of polymerization less than about 7) with an alkyl radical having from one to four carbon atoms. The alkyl radical may be methyl, ethyl, propyl, isopropyl, n-butyl, s-butyl or t-butyl, and the saccharide may be, for example, glucose, maltose, maltotriose, or maltotetraose.

The alkyl glycoside used in conjunction with the invention is preferably methyl glucoside. Most preferably, the methyl glucoside is provided in the form of MeG-206, an aqueous methyl glucoside solution sold by Grain Processing Corporation of Muscatine, Iowa. MeG-206 is a 60% aqueous solution of methyl glucoside, the methyl glucoside being present in a 2:1 ratio of $\alpha:\beta$ isomers (this ratio should be regarded as approximate). The methyl glucoside also may be provided in the form of MeG-365, also sold by Grain Processing Corporation of Muscatine, Iowa. MeG-365 is a 65% aqueous solution of methyl glucoside which exists in the solution as a 2:1 ratio of $\alpha:\beta$ isomers (this ratio also should be regarded as approximate). Another suitable methyl glucoside may be provided as a 70% 1:1 (approximate) mixture of $\alpha:\beta$ methyl glucoside isomers. More generally, any other suitable mixture of methyl glucoside isomers may be employed in conjunction with the invention.

The alkyl glycoside may be present in any amount effective to inhibit shale swelling. Preferably, when the alkyl glycoside is methyl glucoside, the methyl glucoside is present in the drilling fluid in an amount ranging from about 2 to about 4 lb./gallon of the drilling fluid (dry basis MeG).

In another embodiment of the invention, the drilling fluid comprises or includes molasses solids, preferably desugared sugar beet molasses solids. It is contemplated that non-desugared molasses may instead be used. Desugared sugar beet molasses is the by-product of the process used to extract sugar from sugar beet or molasses or from other types of molasses (e.g., sorghum or citrus molasses). Preferred embodiments of the invention make use of desugared sugar beet molasses or sugar cane molasses. With respect to sugar beet molasses, as is well known in the art, sugar beets are used to produce commercial grade sugar that serves as a substitute for the often more expensive cane sugar. The older of the two most widely used processes of removing sugar from sugar beets involves cleaning the beets and slicing them into thin chips. The sliced beets are then subjected to a sugar extraction process whereby hot water is passed over the beets for approximately one hour. This process removes most, but not all, of the sugar from the beets in the form of beet "juice." The beets are then pressed in screw presses to remove the remaining juice therefrom. The juice is then subjected to a process called carbonation, whereby small clumps of chalk are provided in the juice to filter out any non-sugars. The chalk is then filtered from the juice, which is then evaporated to a syrup. The syrup is then boiled until sugar crystals form therein. Once the crystals form, the resulting mixture is centrifuged to separate the crystals from the remaining product, which remaining product is characterized as molasses. Desugared sugar beet molasses preferably is prepared by a process known as the Steffen process, in which a calcium precipitate is formed to remove additional sugar. This process is described briefly in U.S. Pat. No. 5,639,319 to Daly, which purports to teach the use of desugared sugar beet molasses as a tire ballast. Another process for desugaring molasses involves an ion exchange reduction of the sugar content. With respect to sugar cane molasses, this product may be obtained via any method or process known in the art or otherwise found to be suitable. Generally, commercial sugar cane molasses does not undergo a desugaring step subsequent to the production of the molasses. Likewise, sugar beet or other types of molasses may be obtained via any other method known in the art or found to be suitable.

In either instance, the molasses or desugared molasses is a liquid that usually contains approximately 60 to 80% solids, often 60 to 75% solids. The solids contained in the sugar beet molasses are not particularly well characterized but generally speaking, the molasses generally includes residuals, organic acids, salts, proteinaceous material, and other materials. In some embodiments of the invention, desugared molasses is used in a drilling fluid in a drilling process or apparatus. For this embodiment, the molasses can be said to comprise a liquid base (water) in which is carried molasses solids. It should be noted that although the invention encompasses embodiments wherein molasses solids are obtained via drying a molasses solution to solids, the invention is not limited thereto, and the "liquid base" and "molasses solids" may together comprise conventional desugared molasses or conventional molasses that has been diluted. More preferably, the sugar beet molasses is diluted with a liquid base such as water to a solids content of about 20% to about 60%.

In accordance with a highly preferred embodiment of the invention, the drilling fluid includes both an alkyl glucoside and either molasses solids or desugared molasses solids. In this embodiment, the alkyl glucoside and the desugared sugar beet molasses solids may be present in any proportion with respect to each other and preferably are present in a total solids content in the drilling fluid ranging from about 40% to about 80%.

In accordance with preferred embodiments of the invention, the drilling fluid may includes a borehole stability agent that is selected from among maltodextrins, carboxymethyl starches, and hemicellulose. With respect to hemicellulose, hemicellulose is a term used to refer to a wide variety of heteropolysaccharides found in association with cellulose in plant species. Any suitable plant, including various grains and woods, may serve as any source of hemicellulose. The hemicellulose functions to inhibit shale swelling, and may further function as a fluid loss control agent. The hemicellulose may be added in a purified form. Most preferably, the hemicellulose-containing material is produced in accordance with the teachings of U.S. Pat. No. 4,038,481 (Antrim et al.), which discloses the alkaline hydrolysis of corn hulls to yield plural phases including a hemicellulose-rich fraction. The hemicellulose-rich fraction prepared in accordance with the teachings of this patent may be used as the hemicellulose-containing material without subsequent isolation or purification, or this fraction may be concentrated or otherwise modified. The alkaline hydrolysis itself preferably is conducted using potassium hydroxide as the alkaline hydrolyzing species. Potassium is itself believed to function as a shale stability enhancer in a drilling fluid, and thus the potassium hydroxide digest of corn hulls is believed to be particularly suitable for use in conjunction with the invention. More economically, an unrefined aqueous slurry (for example, an alkaline digest of corn hulls) may be used. More generally, hemicellulose may be provided in an unpurified, somewhat "crude" form or in a highly purified form with the purer hemicellulose being preferred from a technical standpoint, but with cruder forms being more economical. In some instances a greater amount of the crude hemicellulose may be desired to achieve the same results as by adding a purer form of hemicellulose.

The hemicellulose containing material is used to provide hemicellulose in the drilling fluid in an amount effective to inhibit swelling of shale. Preferably, if the drilling fluid does not include a maltodextrin, the hemicellulose is present in an amount ranging from about 0.002 to about 0.2 lbs./gallon by dry basis weight. In this embodiment of the invention, these amounts are irrespective of the amount of any cellulose in the drilling fluid.

The drilling fluid may also include a maltodextrin in lieu of or in addition to the hemicellulose-containing material. Maltodextrins are oligo- or poly-saccharides in which the saccharides are linked exclusively or predominantly by 1–4 linkages. In preferred embodiments, at least 50 percent of the saccharide units in the maltodextrin are linked via 1–4 linkages. More preferably, at least about 60 percent of the saccharide units are linked via 1–4 linkages; even more preferably, at least about 80 percent of the saccharide units are so linked. While the drilling fluid may incorporate any maltodextrin or mixture of maltodextrin species, the invention is particularly applicable to mixtures of maltodextrin species in which at least a portion of the maltodextrins in the mixture have a degree of polymerization (DP) greater than 5. Preferably, at least one of the maltodextrin species in the mixture has a DP of 8 or more. More preferably, at least one species has a DP of at least 10. For example, in some embodiments of the invention, a maltodextrin mixture in which at least 80 percent of the maltodextrin species in the mixture have a DP greater than 5 is used, and in some such embodiments, preferably at least 60 percent have a DP greater than 8. In another embodiment, a maltodextrin in which at least 80 percent of the maltodextrin species have a DP greater than 10 is used. In some embodiments of the invention, the DP profile of the maltodextrin is such that at least 75 percent of the maltodextrin species in the mixture have a DP greater than 5 and at least 40 percent of the species in the mixture have a DP greater than 10. The maltodextrins may include saccharide species having an odd DP value, and the profile may be partially defined by a saccharide species having a DP value of 1, for example, dextrose or sorbitol. The mixture further may include other saccharide species or other components. Such starting materials may be obtained conventionally, for example, by the partial hydrolysis of starch.

Suitable maltodextrins are sold under the trademark MALTRIN® by Grain Processing Corporation of Muscatine, Iowa. The MALTRIN® maltodextrins are mixtures of malto-oligosaccharides. Each MALTRIN® maltodextrin is characterized by a typical dextrose equivalent value (DE) and DP profile. Suitable MALTRIN maltodextrins that may be incorporated as borehole stability agents in accordance with the invention, include, for example, MALTRIN® M040, MALTRIN® M050, MALTRIN® M100, MALTRIN® M150, and MALTRIN® M180. Typical approximate DP profiles for the subject MALTRIN maltodextrins are set forth in the following table (the DP profiles being approximate as indicated in the Table):

| | Typical DP profile (% dry solids basis) | | | | | | | | |
|---|---|---|---|---|---|---|---|---|---|
| DP profile | M180 | | M150 | | M100 | | M050 | | M040 | |
| DP > 8 | 46.6 | ±4% | 54.7 | ±4% | 67.8 | ±4% | 90.6 | ±4% | 88.5 | ±4% |
| DP 8 | 3.9 | ±2% | 4.8 | ±1.5% | 4.5 | ±1.5% | 1.5 | ±1% | 2.0 | ±1% |
| DP 7 | 9.5 | ±2% | 9.1 | ±1.5% | 7.0 | ±1.5% | 1.5 | ±1% | 2.4 | ±1% |
| DP 6 | 11.4 | ±2% | 8.4 | ±1.5% | 6.1 | ±1.5% | 1.4 | ±1% | 1.8 | ±1% |
| DP 5 | 5.9 | ±2% | 4.7 | ±1.5% | 3.3 | ±1.5% | 1.3 | ±1% | 1.3 | ±1% |
| DP 4 | 6.4 | ±2% | 5.5 | ±1.5% | 3.7 | ±1.5% | 1.1 | ±1% | 1.4 | ±1% |
| DP 3 | 8.3 | ±2% | 6.7 | ±1.5% | 4.2 | ±1.5% | 1.0 | ±1% | 1.4 | ±1% |
| DP 2 | 6.2 | ±2% | 4.8 | ±1% | 2.5 | ±1% | 0.8* | ±1% | 0.9* | ±1% |
| DP 1 | 1.8 | ±1.5% | 1.3 | ±1% | 0.7* | ±1% | 0.8* | ±1% | 0.3* | ±1% |
| | DE** = 18 | | DE = 15 | | DE = 10 | | DE = 5 | | DE = 5 | |

*Minimum Value = 0%
**Dextrose Equivalent Value

Other suitable maltodextrins as may be known or discovered also may be considered useful in conjunction with the invention.

The maltodextrin may be present in any amount effective to inhibit shale swelling. When the drilling fluid includes a maltodextrin borehole stability agent and does not include hemicellulose, the maltodextrin preferably is present in a total amount ranging from about 0.002 to about 0.2 lbs./gallon, more preferably about 0.01 to about 0.15 lbs./gallon by dry basis weight of the maltodextrin. In this embodiment of the invention, these amounts are irrespective of the amount of cellulose in the drilling fluid.

The borehole stability agent alternatively or additionally may comprise a carboxyalkyl starch, preferably a carboxymethyl starch. Carboxymethyl starches are known in the art, and the preparation of such starches is described in *Modified Starches Properties and Uses* (Wurzburg, O. B., Ed.) 1986 p. 187–88. When the drilling fluid includes a carboxymethyl starch but does not include any other borehole stability agent, the carboxymethyl starch preferably is present in the drilling fluid in an amount ranging from about 0.002 to about 0.2 lbs./gallon, more preferably about 0.01 to about 0.15 lbs./gallon. In this embodiment, these amounts are irrespective of the amount of cellulose in the composition. The carboxyalkyl starch may have a degree of substitution (DS) of any suitable value. Adequate results may be obtained when the starch has a DS of about 0.2.

The drilling fluid of the invention may incorporate a borehole stability agent that includes a maltodextrin and hemicellulose in any combination of two or more of the foregoing. In such case, the total amount of the combined borehole stability agent present in the drilling fluid preferably ranges from about 0.002 to about 0.2 lbs./gallon by dry basis weight, irrespective of the amount of cellulose in the drilling fluid, with the maltodextrin, starch, and hemicellulose being present in any amount relative to one another. More generally, the borehole stability agent may be present in any amount effective to inhibit shale swelling.

The drilling fluid further preferably includes a salt, preferably sodium or potassium chloride. Salts are believed to assist the alkyl glycoside and/or the borehole stability agent in inhibiting shale swelling. When sea water is used as the liquid base, or when the bore formation includes salt water, salt will be present in the form of sodium chloride. Other salts that may be incorporated in the composition of the invention include potassium chloride, calcium chloride, sodium acetate, potassium acetate, calcium acetate, and the like. The salt is preferably present in the drilling fluid in an amount ranging from about 0.15 to about 0.8 lbs./gallon by dry basis weight but, more generally, may be present in any amount effective to assist in inhibiting shale swelling.

The drilling fluid may include further additives as may be appropriate. Examples of additives that are known in the art include barite, and other weighting agents, bentonite, low- and-medium-yield clays, salt water clay, iron oxide, calcium carbonate, starch, carboxymethylcellulose, acrylonitrile, gums, molecularly dehydrated phosphate, tannin compounds, quebracho, lignins, lignosulfonate, mica, sugar cane fibers, and granular materials. Generally, the drilling fluid may contain other ingredients such as weighting agents, viscosifiers, fluid loss reducing additives, rheological modifying additives, emulsifiers, seepage loss control additives, lubricity additives, defoamers, pH control additives, dispersants, and so forth, all of such materials being solubilized, suspended or dispersed in the drilling fluid in such amounts as may be appropriate. It is generally contemplated that any other suitable additive as is known or as may be discovered may be employed in connection with the invention.

The invention further encompasses a drilling fluid additive composition that includes an alkyl glycoside and/or sorbitol and/or molasses solids in combination with carboxyalkylated corn hulls. Generally, the alkyl glucoside, sorbitol, and/or molasses solids are present in a ratio of about 0.5:1 to 80:1 corn hulls:total glycoside and molasses and sorbitol, more preferably, a ratio of 10:1 to 40:1. In accordance with these embodiments of the invention, the liquid base is not present, or is present in a smaller amount than is intended in the final drilling composition. The composition may be supplied to drillers, for example, to be used as an additive to seawater or brine in forming a drilling fluid in situ, or may be supplied to fabricators of drilling fluid to be blended with a liquid base. The composition may include derivatized or nonderivatized hemicellulose, starch, and/or maltodextrin which preferably are present in an amount ranging from about 0.1% to about 5% by the dry basis weight of the alkyl glucoside or molasses solids (or total dry weight of the molasses solids and alkyl glucoside). The composition may be dry or may be in liquid form, with the derivatized or nonderivatized hemicellulose, starch, and maltodextrin being dissolved in a liquid. The composition of this embodiment of the invention may include other ingredients, such as salts or other additives, which other ingredient may be employed in such amounts as may be desired.

The invention also encompasses a drilling apparatus. With reference to the FIGURE, the apparatus is shown generally at 10 and includes a drill string 1, the drill string 11 generally including a drive 12, a drill stem 14, and a drill bit 15 (the drive 12 is shown as a top drive, but other configurations, such as a rotary table, are possible). The drill stem 14 may include components such as drill collars, drill pipe and a kelly (not separately shown). The drill string 11 is fluidically connected to a source 16 of drilling fluid which comprises the drilling fluid of one or more embodiments of the invention. Generally, the source 16 will be suction tanks 17 that are fluidically coupled to mud pumps 18 and optionally a mud pit (not shown). The mud pump circulates fluid through the drill string 11, i.e., through and around the drill bit and/or through the annulus between the drill stem and the borehole. The apparatus generally may take any other conventional or otherwise suitable form and is not limited to the configuration shown in the FIGURE.

The invention also encompasses a process for drilling. The process includes the step of circulating the drilling fluid of one or more embodiments of the present invention through the drill string of a drilling apparatus during drilling operations (including but not limited to wellbore drilling and completion). No special apparatus is contemplated by the process of the invention, but instead the process is contemplated to be useful in connection with any suitable drilling apparatus. In preferred embodiments, the drilling fluid is circulated under circumstances wherein the drilling fluid will be exposed to elevated temperatures for extended time periods. For instance, the drilling fluid may be exposed to temperatures in excess of 100° F., in excess of 125° F., in excess of 150° F., in excess of 175° F., in excess of 200° F., in excess of 225° F., in excess of 250° F. in excess of 275° F. or in excess of 300° F. The drilling fluid may be exposed to any one of these high temperature conditions for a period of time in excess of 1 hour, in excess of 2 hours, in excess of 3 hours, in excess of 4 hours, in excess of 5 hours, in excess of 6 hours, in excess of 7 hours, in excess of 8 hours, in excess of 9 hours, in excess of 10 hours, in excess of 11 hours, in excess of 12 hours, in excess of 13 hours, in excess of 14 hours, in excess of 15 hours, in excess of 16 hours, in excess of 17 hours, in excess of 18 hours, in excess of 19 hours, in excess of 20 hours, in excess of 21 hours, in excess of 22 hours, in excess of 23 hours, or in excess of 24 hours.

The following examples are provided to illustrate the present invention, but should not be construed as limiting in scope. Examples 1–26 are provided to illustrate the properties of various drilling fluid ingredients other than carboxyalkylated corn hulls.

EXAMPLES

VOLCLAY clay bentonite tablets (American Colloid Company, Skokie, Ill.) were soaked in various drilling fluids and observed over a period of time to simulate the effect of the drilling fluid on shale in a well bore. The stability of each bentonite pellet was evaluated according to the following scale:

1=unaltered
2=hard, intact but loose on surface
3=swollen, softening, still intact
4=together, but no integrity
5=dissolved These evaluations were designed to evaluate the drilling fluids as against one another, rather than to directly evaluate efficiency in actual borehole conditions.

The drilling fluids were prepared using as alkyl glycosides MeG-206 (a 60% aqueous solution of methyl glucoside existing as a 2:1 ratio of α:β ratio isomers), MeG-365 (a 65% aqueous solution of methyl glucoside existing as a 2:1 ratio of α:β isomers), and a 70% aqueous solution of methyl glucoside existing as a 1:1 ratio of α:β ratio) (designated hereunder as MeG-207). As borehole stability agents, MALTRIN® M040, M100, and M180 (maltodextrins available from Grain Processing Corporation of Muscatine, Iowa) and the soluble fraction resulting from alkaline treatment of corn hulls (designated hereunder as "HC") were used. As a control, drilling fluids were prepared using only water and using only MeG-365 or MeG-207, without the addition of hemicellulose, maltodextrin, or molasses. All of the drilling fluids were prepared at an initial pH of 7 unless otherwise indicated.

Control

Drilling fluids were prepared with MeG-365 and MeG-207. The stability of the bentonite pellets in each fluid was evaluated. The stability of the pellets in pure water also was evaluated. The following results were obtained.

| Drilling Fluid | 1 hr. | 2 hr. | 4 hr. | 8 hr. | 24 hr. |
|---|---|---|---|---|---|
| H₂O | 4 | 4.5 | 5 | 5 | 5 |
| 365 | 2 | 2.5 | 3 | 4.5 | 5 |
| 207 | 1 | 1 | 1.5 | 2 | 3 |

| Drilling Fluid | 1 hr. | 2 hr. | 4 hr. | 20 hr. | 30 hr. |
|---|---|---|---|---|---|
| 365 | 2 | 2 | 3.5 | 4.5 | 5 |
| 207 | 1 | 1 | 1.5 | 2.5 | 3 |

| Drilling Fluid | 1 hr. | 4 hr. | 8 hr. | 24 hr. | 32 hr. | 56 hr. |
|---|---|---|---|---|---|---|
| 365 | 1.5 | 3 | 3.5 | 4.5 | — | — |
| 207 | 1 | 1.5 | 2 | 3.5 | 4 | 5 |

| Drilling Fluid | 1 hr. | 2 hr. | 4 hr. | 8 hr. | 24 hr. | 48 hr |
|---|---|---|---|---|---|---|
| 365 | 1.5 | 2 | 3 | 3.5 | 4.5 | — |
| 207 | 1 | 1 | 1.5 | 1.5 | 3 | — |

The bentonite pellets were substantially unstable in water, and fared only somewhat better in the drilling fluids that included methyl glucoside and water but that did not include maltodextrin, hemicellulose, or molasses.

Example 1

MeG+Maltodextrin

Drilling fluids were prepared using methyl glucoside and maltodextrin, and the bentonite stability test was repeated for each fluid. The following results were obtained. Maltodextrin percentages in these tables express weight percent maltodextrin by dry basis of methyl glucoside.

| Drilling Fluid | 1 hr. | 2 hr. | 4 hr. | 8 hr. | 24 hr. |
|---|---|---|---|---|---|
| 365 + 5% M040 | 1 | 1 | 1.5 | 1.5 | 2 |
| 365 + 5% M100 | 1 | 1 | 1.5 | 1.5 | 2.5 |
| 365 + 5% M180 | 1.5 | 1.5 | 2 | 2 | 4 |

| Drilling Fluid | 1 hr. | 2 hr. | 4 hr. | 20 hr. | 30 hr. |
|---|---|---|---|---|---|
| 365 + 1% M040 | 1.5 | 2 | 2.5 | 4 | 4 |
| 365 + 3% M040 | 1 | 1.5 | 1.5 | 2.5 | 3 |

| Drilling Fluid | 1 hr. | 4 hr. | 8 hr. | 24 hr. |
|---|---|---|---|---|
| 365 + 0.5% M100 | 1.5 | 2 | 3.5 | 4 |
| 365 + 1% M100 | 1 | 1.5 | 1.5 | 3.5 |

As set forth above, the bentonite pellets generally were more stable in the drilling fluids of Example 1 than in the control drilling fluids.

Example 2

MeG+Maltodextrin+NaCl

Drilling fluids were prepared using MeG, maltodextrin, and sodium chloride. The bentonite stability test was repeated for each fluid, and the following results were obtained. Sodium chloride percentages in these tables express weight percent sodium chloride by dry basis weight of methyl glucoside.

| Drilling Fluid | 1 hr. | 2 hr. | 4 hr. | 8 hr. | 24 hr. |
|---|---|---|---|---|---|
| 365 + 5% M040 + 10% NaCl | 1 | 1 | 1 | 1.5 | 2 |
| 365 + 5% M100 + 10% NaCl | 1 | 1 | 1.5 | 1.5 | 2 |
| 365 + 5% M180 + 10% NaCl | 1 | 1.5 | 1.5 | 2 | 4 |

| Drilling Fluid | 1 hr. | 2 hr. | 4 hr. | 20 hr. | 30 hr. |
|---|---|---|---|---|---|
| 365 + 1% M040 + 5% NaCl | 1.5 | 1.5 | 1.5 | 2 | 3 |
| 365 + 3% M100 + 5% NaCl | 1 | 1 | 1.5 | 2 | 3 |

| Drilling Fluid | 1 hr. | 4 hr. | 8 hr. | 24 hr. |
|---|---|---|---|---|
| 365 + 0.5% M040 + 2% NaCl | 1.5 | 1.5 | 2.5 | 3.5 |
| 365 + 1% M100 + 2% NaCl | 1 | 1.5 | 1.5 | 3 |
| 365 + 0.5% M100 + 5% NaCl | 1.5 | 2 | 2 | 3.5 |
| 365 + 1% M100 + 5% NaCl | 1 | 1.5 | 1.5 | 3.5 |

As seen, the addition of sodium chloride to the drilling fluid rendered the fluid retention less aggressive toward the bentonite pellets.

Example 3

MeG+HC

Drilling fluids were prepared using MeG and the hemicellulose fraction of alkaline treated corn hulls. The bentonite stability tests were repeated, and the following examples were obtained. Hemicellulose percentages in these tables are expressed as weight percent dry hemicellulose provided in the HC solution by dry basis MeG.

| Drilling Fluid | 1 hr. | 2 hr. | 4 hr. | 8 hr. |
|---|---|---|---|---|
| 365 + 0.6% hemicellulose | 1 | 1 | 1 | 1.5 |
| 365 + 0.6% hemicellulose (solution diluted to 50%) | 2.5 | 3.5 | 4 | 4.5 |

| Drilling Fluid | 1 hr. | 2 hr. | 4 hr. | 20 hr. | 30 hr. |
|---|---|---|---|---|---|
| 365 + 1% hemicellulose | 1 | 1 | 1 | 2 | 2.5 |

| Drilling Fluid | 1 hr. | 2 hr. | 4 hr. | 8 hr. | 24 hr. | 48 hr. |
|---|---|---|---|---|---|---|
| 207 + 0.5% hemicellulose | 1 | 1 | 1 | 1 | 1.5 | 1.5 |
| 365 + 0.6% hemicellulose | 1 | 1 | 1 | 1.5 | — | — |

As seen, the bentonite pellets were substantially more stable in the drilling fluids prepared using MeG and hemicellulose than in the drilling fluids prepared using only MeG.

Example 4

MeG+HC+NaCl

Drilling fluids were prepared using MeG, the hemicellulose and sodium chloride. The bentonite stability tests were repeated and the following results were obtained.

| Drilling Fluid | 1 hr. | 2 hr. | 4 hr. | 20 hr. | 30 hr. |
|---|---|---|---|---|---|
| 365 + 1% hemicellulose + 5% NaCl | 1 | 1 | 1 | 1.5 | 2 |

| Drilling Fluid | 1 hr. | 4 hr. | 8 hr. | 24 hr. | 32 hr. | 56 hr. |
|---|---|---|---|---|---|---|
| 365 + 0.5% hemicellulose + 2% NaCl | 1 | 1.5 | 2 | 2 | 2.5 | 3 |
| 365 + 1% hemicellulose + 5% NaCl | 1 | 1 | 1.5 | 1.5 | 2 | 2.5 |

As seen, the bentonite pellets were substantially more stable in the drilling fluids thus prepared then in the control drilling fluids. Addition of salt to the drilling fluid reduced the aggressiveness of the fluid towards the bentonite pellets.

Comparative Examples 1–11

Drilling fluids were prepared using MeG and other organic additives in accordance with the following table. The bentonite stability test was repeated for each drilling fluid, giving the following results:

| Drilling Fluid | 1 hr. | 2 hr. | 4 hr. | 8 hr. | 24 hr. |
|---|---|---|---|---|---|
| 365 + 10% NaCl* | 2 | 2.5 | 3.5 | 4 | 5 |
| 365 at pH 10 | 2.5 | 3 | 3.5 | 4 | 5 |
| 365 + 5% hydroxy-propyl starch* | 2 | 2.5 | 3 | 3 | — |
| 365 + 2% corn starch* | 2 | 2.5 | 2.5 | 4 | — |
| 365 + 2% solubilized starch* | 1.5 | 2 | 2.5 | 3.5 | 4.5 |
| 365 + 2% polyethylene oxide* | 2 | 2.5 | 3.5 | 4 | 4.5 |
| 365 + 2% ethoxylated starch* | 1.5 | 2.5 | 3.5 | 4 | 4.5 |
| 365 + 2% acid modified starch* | 1.5 | 2 | 3 | 4 | 4.5 |
| 365 + 2% cationic starch* | 1.5 | 2 | 3.5 | 4 | 4.5 |
| 365 + 2% gum arabic* | 1.5 | 2 | 3 | 4.5 | — |
| 365 + 2% guar gum* | 1 | 1 | 1.5 | 2 | — |

*dry basis MeG.

As seen, the bentonite pellets generally were not as stable in the drilling fluids of the comparative examples as in the drilling fluids of the invention. These results demonstrate the surprising benefits of using maltodextrin and/or hemicellulose as a borehole stability agent as compared with other organic species.

Example 5

Water Activity

The water activity, or relative humidity that exists in the space above the drilling fluid in an enclosed container, was evaluated for each of the drilling fluids of the invention and for control drilling fluids. It is believed that the stability of wellbore formations in a drilling fluid generally improves as the water activity value of the drilling fluids decreases.

The following results were obtained:

| Drilling Fluid (Control) | Water activity @ 25° C. |
|---|---|
| Pure H$_2$0 | 1.01 (as measured) |
| MeG-365 | 0.864 |
| MeG-207 | 0.789 |
| MeG-207 diluted to 65% solids | 0.851 |

| Drilling Fluid (Invention) | Water Activity @ 25° C. |
|---|---|
| MeG-207 + 0.5% hemicellulose[1] | 0.780 |
| MeG-365 + 0.5% hemicellulose[1] | 0.889 |
| MeG-365 + 1% hemicellulose[1] | 0.836 |
| MeG-365 + 2% hemicellulose[1] | 0.816 |
| MeG-365 + 0.5% hemicellulose[1] + 2% NaCl[2] | 0.810 |
| MeG-365 + 0.5% hemicellulose[1] + 5% NaCl[2] | 0.727 |
| MeG-365 + 1% hemicellulose[1] + 5% NaCl[2] | 0.768 |
| MeG-365 + 0.5% Maltodextrin[2] | 0.844 |
| MeG-365 + 1% Maltodextrin[2] | 0.855 |
| MeG-365 + 2% Maltodextrin[2] | 0.845 |
| MeG-365 + 0.5% Maltodextrin[2] + 2% NaCl[2] | 0.820 |
| MeG-365 + 0.5% Maltodextrin[2] + 5% NaCl[2] | 0.759 |
| MeG-365 + 1% Maltodextrin[2] + 2% NaCl[2] | 0.811 |
| MeG-365 + 1% Maltodextrin[2] + 5% NaCl[2] | 0.756 |

[1] by net basis, on dry MeG basis.
[2] On dry basis MeG.

Example 6

A drilling fluid comprising MeG-365, 5% MALTRIN® M040 (on dry basis MeG), and 0.6% hemicellulose (on dry basis hemicellulose) is prepared.

Example 7

A drilling composition comprising 50% polyglycerine, 20% water, 1% hemicellulose (dry basis), and 29% MeG (2:1 α:β)(dry basis) is prepared. The MeG is obtained from MeG-365.

Example 8

A drilling composition comprising 50% polyglycerine, 20% water, 1% maltodextrin (MALTRIN® M180)(dry basis), and 29% MeG (2:1 α:β)(dry basis) is prepared. The MeG is obtained from MeG-360.

Example 9

A composition comprising 65% MeG and 2.5% hemicellulose is prepared (balance water). The composition is suitable for addition to seawater to form a drilling fluid.

Example 10

A drilling fluid comprising the following ingredients is prepared:

| | | |
|---|---|---|
| 350 lbs. | | Fresh Water |
| 20 lbs. | | Bentonite |
| 4 lbs. | | Lime |
| 3 lbs. | | Polysaccharide deflocculant |
| 0.75 lb. | | KOH |
| 1–2 lbs. | | Drilling Starch |
| 0.25 lb. | | Lignite |
| 10–30 lbs. | | MeG (2:1 α:β) |
| 0.1–0.3 lbs. | | Hemicellulose |

Example 11

A composition comprising the following ingredients is prepared:

| | | |
|---|---|---|
| 350 | lbs. | Fresh Water |
| 20 | lbs. | Bentonite |
| 4 | lbs. | Lime |
| 3 | lbs. | Polysaccharide Deflocculant |
| 0.75 | lb. | KOH |
| 1–2 | lbs. | Drilling Starch |
| 0.25 | lb. | Lignite |
| 10–30 | lbs. | MeG (2:1 α:β) |
| 0.1–0.3 | lbs. | Maltodextrin (MALTRIN® M040) |

Example 12

A composition comprising the following ingredients is prepared:

| | | |
|---|---|---|
| 250 | lbs. | Sea Water |
| 11 | lbs. | KCl |
| 100 | lbs. | Bentonite |
| 0.50 | lb. | NaOH |
| 1–4 | lbs. | Drilling Starch |
| 10–30 | lbs. | MeG (2:1 α:β) |
| 0.1–0.3 | lbs. | Hemicellulose |

Example 13

A composition comprising the following ingredients is prepared:

| | | |
|---|---|---|
| 250 | lbs. | Sea Water |
| 11 | lbs. | KCl |
| 100 | lbs. | Bentonite |
| 0.50 | lb. | NaOH |
| 1–4 | lbs. | Drilling Starch |
| 10–30 | lbs. | MeG (2:1 α:β) |
| 0.1–0.3 | lbs. | Maltodextrin |

Example 14

In accordance with the procedures specified in U.S. Pat. No. 4,038,481, corn hulls from a corn wet milling operation are wet screened through a U.S. No. 6 screen at about 50° C. using sufficient water to substantially remove the fine fiber, most of the starch and some of the protein and lipid material present. The hulls remaining on the screen are then slurried in water and the pH of the slurry is adjusted with lime to pH 6.5 and treated at 79° C. for 1 hour with a *B. subtilis* alpha-amylase (obtained from Genencor International) at a dosage of about 3 liquefons/g (units as defined by Genencor) of hull solids. The hulls are filtered, washed and dried to a moisture range of 5 to 10 percent in a forced air oven at 70° C.

Fifty-two grams (50.6 g dry basis) of the hulls are slurried in 1000 ml of 69 percent aqueous ethanol (v/v) containing 5 g of reagent grade NaOH, and the slurry is heated in a Parr model 4522 pressure reactor at 100° C. for 3 hours. The reaction mixture, at a temperature of about 50° C., is then filtered through a Buchner funnel using Whatman No. 3 filter paper.

The filter cake is then extracted by refluxing at about 82° C. with 1000 ml of 69 percent aqueous ethanol (v/v) for one hour, and the mixture is filtered at a temperature of about 50° C. through a Buchner funnel using Whatman No. 3 paper. The filter cake is next slurried in 1000 ml of 69 percent aqueous ethanol (v/v), and the slurry is adjusted with diluted HCl to pH 2 and is filtered as above. The filtrate is next combined with the filtrates from the two previous filtrations. The combined filtrates then are adjusted to pH 2 with HCl, and evaporated to dryness. The residue is dried in a vacuum oven at 70° C.

To extract the hemicellulose, the filter cake from the above procedure is slurried in 1000 ml of deionized water, held at room temperature for about two hours, and filtered through a coarse sintered glass funnel. This procedure is repeated a second time. The filtrates from these two extractions are combined and concentrated to about 10 percent solids by evaporation of the water on a vacuum rotary evaporator at a temperature of 40° C. and a vacuum of about 20 inches of mercury. The concentrated hemicellulose solution is then dried on a drum drier having a surface temperature of 130° C., and the dried hemicellulose is ground in a Waring blender.

The hemicellulose is added to 10 kg MeG-365 in an amount of 2.5% hemicellulose (on dry basis MeG) to form a drilling fluid.

Example 15

Various drilling fluids were prepared as set forth in detail below. The ability of each fluid to stabilize shale was evaluated by measuring the amount of time required for a bentonite clay pellet to break down (as was determined when the pellet had reached or passed "4" on the scale discussed in the earlier Examples). For control purposes, drilling fluids that included methyl glycoside but that did not include a borehole stability agent were evaluated. The compositions of the drilling fluids that were prepared and the results of the stability tests are set forth below.

| Drilling Fluid | Time to pellet breakdown |
|---|---|
| 365 | <1 day |
| 207 | <2 days |
| 365 + 4% M040 + 4% KOH | 7 days |
| 365 + 4% CMS + 4% KOH | >25 days |
| 365 + 2% CMS + 4% KOH | 5 days |
| 365 + 1% CMS + 4% KOH | 4 days |
| 365 + 2% CMS + 2% KOH | 4 days |
| 365 + 1% CMS + 2% KOH | 3 days |

CMS is carboxymethyl starch having a DS of 0.2

It is thus seen that both the maltodextrin and the carboxymethyl starch tested functioned as borehole stability agents.

As a control for Examples 16 through 20, the following drilling fluids were evaluated.

| Drilling Fluid | 4 hr. | 8 hr. | 16 hr. |
|---|---|---|---|
| MeG-206 | 3 | 3.5 | 4 |
| MeG-207 | 1.5 | 2 | 2 |

Example 16

In accordance with the procedures specified in U.S. Pat. No. 4,038,481, five hundred g dry basis corn hulls containing 766 g water was added to sufficient water to give a total weight of 5000 g. The stirred slurry was heated and maintained at 82° C. to 96° C. for two hours. The hot slurry was then filtered through a No. 60 Mesh A.S.T.M.E. Standard Testing Sieve. The retained solids were subjected to a second treatment of slurrying, stewing, and filtering, and then to a third treatment of slurrying, stewing, and filtering. The retained solids were crumbled, placed on screens, and allowed to air-dry at room temperature.

One hundred g dry basis of the treated corn hulls thus obtained were added to a solution already containing 1610 ml 190 proof ethanol, 390 ml water, and 20 g 50% NaOH in a reaction flask equipped with a reflux condenser and mechanical stirring. The stirred reaction mixture was heated to the reflux temperature and then refluxed for three hours at the reflux temperature of 78° C. The reaction mixture was cooled to 40° C., and then it was vacuum filtered across a 40–60° C. fritted glass funnel. The retained solids were returned to the reaction flask and recurred in a solution already containing 1610 ml 190 proof ethanol and 390 ml water. The slurry was heated to reflux temperature and then refluxed for one hour at the reflux temperature of 78° C. The reaction mixture was cooled to 20° C., and then it was vacuum filtered across a 40–60° C. fritted glass funnel. The retained solids were reslurried in a solution already containing 1610 ml 190 proof ethanol and 390 ml water at 20° C., and then the pH of the slurry was adjusted to 6.5 with 5.8N hydrochloric acid. The slurry was then vacuum filtered across a 40–60° C. fritted glass funnel.

The retained solids were reslurried in 2000 ml water in a reaction flask equipped with a reflux condenser and mechanical stirring. The stirred mixture was heated to the reflux temperature and then refluxed for two hours at the reflux temperature of 98° C. The mixture was cooled to 50° C., and then was vacuum filtered across a 40–60° C. fritted glass funnel. The filtrate, referred to as FILTRATE A, which contained corn hull hemicellulose, was retained. The retained solids were reslurried in 2000 ml water in a reaction flask equipped with a reflux condenser and mechanical stirring. The stirred mixture was heated to the reflux temperature and then refluxed for two hours at the reflux temperature of 98° C.

The mixture was cooled to 50° C., and then it was vacuum filtered across a 40–60° C. fritted glass funnel. The filtr hull hemicellulose, was retained. The retained solids were reslurried in 2000 ml water in a reaction flask equipped with a reflux condenser and mechanical stirring. The stirred mixture was heated to the reflux temperature and then refluxed for two hours at the reflux temperature of 98° C. The mixture was cooled to 50° C., and then it was vacuum filtered across a 40–60° C. fritted glass funnel. The filtrate, referred to as FILTRATE C, containing the corn hull hemicellulose was retained. The combined FILTRATES A, B, and C containing the corn hull hemicellulose were assayed to contain 54.5 g solids. Combined filtrates A, B, and C then were spray dried. The resulting hemicellulose was formulated into an adhesive paste by mixing 15 parts weight hemicellulose of the spray-dried hemicellulose with 85 parts water.

A drilling fluid comprising 48.5% MeG-206 (60% solids), 46.5% desugared sugar beet molasses, and 3% hemicellulose was prepared as described above and evaluated for bentonite pellet stability. The following results were obtained.

| 4 hr. | 8 hr. | 16 hr. |
|---|---|---|
| 1.5 | 2 | 2 |

As seen, this product established satisfactory results.

Example 17

A drilling fluid composed of 48% MeG-206 (60% solids), 48% desugared sugar beet molasses (60% solids) and 4% corn hull hemicellulose prepared as in Example 16 was prepared and evaluated for bentonite pellet stability. The following results were obtained.

| 4 hr. | 8 hr. | 16 hr. |
|---|---|---|
| 2 | 1.5 | 1.5 |

As seen, this product exhibited excellent results.

Example 18

A drilling fluid composed of 97% MeG-206 and 3% corn hull hemicellulose prepared as in Example 16 was prepared and evaluated for bentonite pellet stability. The following results were obtained.

| 4 hr. | 8 hr. | 16 hr. |
|---|---|---|
| 2 | 3 | 3.5 |

As seen, this product exhibited somewhat satisfactory results.

Example 19

A drilling fluid comprising 50% MeG-206 and 50% desugared sugar beet molasses was prepared and evaluated for bentonite pellet stability. The following results were obtained.

| 4 hr. | 8 hr. | 16 hr. |
|---|---|---|
| 1.5 | 2.5 | 2.5 |

As seen, this product exhibited satisfactory results.

Example 20

A drilling fluid comprising 49% MeG-206, 49% desugared sugar beet molasses, and 2% corn hull hemicellulose prepared in accordance with the teachings of U.S. Pat. No. 6,063,178 to McPherson et al., assignor to Grain Processing Corporation of Muscatine, Iowa was prepared and evaluated for bentonite pellet stability. The following results were obtained.

| 4 hr. | 8 hr. | 16 hr. |
|-------|-------|--------|
| 1 | 1.5 | 1.5 |

As seen, this product exhibited excellent results.

Example 21

The following drilling fluids were evaluated for bentonite pellet stability at 16 hours. The results are shown following the description of the drilling fluid. In this example, the hemicellulose was a dry solid prepared in accordance with the description provided in prior U.S. Pat. No. 6,063,178.

| Drilling Fluid | 16 hr. |
|----------------|--------|
| MeG-206 | 4 |
| Desugared Sugar Beet Molasses (60% solids) | 2.5 |
| 98% MeG-206 + 2% hemicellulose | 3 |
| 98% Desugared Sugar Beet Molasses (60% solids) + 2% hemicellulose | 2 |

Example 22

A drilling fluid comprising desugared cane sugar molasses that has been diluted to 30% solids with salt water is circulated through a drill string.

Example 23 and Comparative Examples 12–19

In these and the following Examples the plastic viscosity (PV, centipoises) yield point (YP, lb/100 ft$^2$), gel strength (10 sec. gel strength, lb/100 ft$^2$), centipoises reading at rpm, and fluid loss were obtained by the procedures set forth in the American Petroleum Institute's Specification 13A: Drilling Fluid Materials, section 11 and in the American Petroleum Institute's Recommended Practice 13B-1.

Hemicellulose was obtained from corn hulls. The hulls, 300 pounds, were added to 220 gallons water to form a slurry. The pH of the slurry was adjusted to 6.5 to 7.0 with 50% NaOH. The slurry was continuously jet-cooked at 235–245° F., 35 psig. The slurry of cooked corn hulls was centrifuged to remove water and the cooked starch suspended in the water. The centrifuged cooked corn hulls were added to 200 gallons of water at 160° F. to form a slurry. The slurry was centrifuged to remove water and the cooked starch was suspended in the water.

The destarched corn hulls were added to 220 gallons of water. To the slurry was added 1.6 gallons of 50% NaOH. The alkaline slurry of destarched hulls was continuously jet-cooked at 235–245° F., 35 psig. The paste of alkaline cooked corn hulls was centrifuged to remove insolubles. The alkaline solution of hemicellulose was concentrated by vacuum evaporation to a syrup having a solids content of 10%.

The alkaline 10% syrup of hemicellulose, approx. 100 gallons, was pumped into a stirred tank containing 240 gallons of ethanol to precipitate the corn hull hemicellulose. The alcoholic slurry of corn hull hemicellulose was vacuum filtered to remove the mother liquor from the insoluble corn hull hemicellulose.

The alcohol insoluble corn hull hemicellulose was dissolved in 120 gallons of water. To the solution was added 1.5 gallons of 35% hydrogen peroxide, and the pH of the solution was adjusted to 11.6 with 50% NaOH. The solution was heated to 190–195° F. and held at that temperature with stirring for two hours. The solution was cooled to 70–75° F., and the pH was adjusted to 3.9–4.1 with 3% hydrochloric acid. The solution of hemicellulose was polish filtered.

The solution of hemicellulose was pumped into a stirred tank containing 240 gallons of ethanol (95%) to precipitate the corn hull hemicellulose. The alcoholic slurry of corn hull hemicellulose was vacuum filtered to remove the mother liquor from the insoluble corn hull hemicellulose. The corn hull hemicellulose was dissolved in 50 gallons of water to give a solution of corn hull hemicellulose. This solution was spray-dried to give dry corn hull hemicellulose.

Saturated and 4% salt solutions were prepared in accordance with the American Petroleum Institute's Specification 13A, Section 11. Solutions including a fluid loss additive were prepared in accordance with the following formulation.

| Salt Solution (saturated or 4%) | 350 ml |
|---------------------------------|--------|
| NaHCO$_3$ | 1.5 |
| API Standard Base Clay | 35 g |
| Fluid Loss Additive | 3.5 g |

The fluids were static aged for 16 hours at room temperature. Fluid loss of hemicellulose was determined and fluid loss of other fluid loss control agents was determined for control purposes. The following results were obtained.

4% salt Mud

| | Example | | | | |
|---|---|---|---|---|---|
| | 23 | CE 12 | CE 13 | CE 14 | CE 15 |
| Fluid Loss Additive | Hemicellulose | Derivatized Crosslinked Corn Starch (CHEMSTAR Starpak DP) | Pregelled potato starch (BAROID DEXTRID) | Pregelled corn starch (BAROID IMPERMEX L) | Non-pregelled Hydroxypropyl crosslinked corn starch (Grain Processing Corporation PURE-GEL B994) |

-continued

| | Example | | | | |
|---|---|---|---|---|---|
| | 23 | CE 12 | CE 13 | CE 14 | CE 15 |
| Additive Concentration (ppb) | 3.5 | 3.5 | 3.5 | 3.5 | 3.5 |
| 600 RPM (cp) | 11.0 | 21.0 | 8.0 | 16.0 | 6.0 |
| Fluid Loss (ml) | 6.0 | 7.2 | 7.2 | 7.2 | 100.0 |

Saturated Salt Mud

| | Example | | | | |
|---|---|---|---|---|---|
| | 23 | CE 16 | CE 17 | CE 18 | CE 19 |
| Fluid Loss Additive | Hemicellulose | Derivatized crosslinked corn starch | Pregelled potato starch | Pregelled corn starch | Non-pregelled crosslinked corn starch |
| Additive Concentration (ppb) | 3.5 | 3.5 | 3.5 | 3.5 | 3.5 |
| 600 RPM (cp) | 19.5 | 18.5 | 12.0 | 9.0 | 12.0 |
| Fluid Loss (ml) | 5.4 | 6.2 | 6.4 | 7.2 | 106.0 |

It is thus been that the foregoing hemicellulose-based drilling fluids provided excellent fluid loss control properties, even upon aging (where aging was at room temperature).

Example 24 and Comparative Examples 20–23

Corn hull hemicellulose was evaluated for its effect on fluid loss in 17 percent calcium chloride brine mud. Using the equipment specified in the American Petroleum Institute's Recommended Practice 13 B-1, a calcium chloride solution was prepared by adding 6855 g $CaCl_2$ into 334 ml deionized water. To 300 ml of this solution while stirring with a mixer was added 0.5 g magnesium oxide for five minutes. While stirring, 1.0 g of XCD Xanthan gum viscosifier was added slowly and evenly. The mixture was blended for five minutes. The container was removed from the mixer and the sides were scraped to incorporate any material adhering to the sides of the container. This was repeated after another 5 minutes of stirring and again after another 10 minutes of stirring (total mix time of 20 minutes).

Under stirring, 4 g of the fluid loss material to be tested was added over 60 seconds. The mixture was blended with periodic scraping as before for a total mix time of 20 minutes. This procedure was repeated to add 116 g of barite and again to add 30 g of Rev Dust. The mixture was aged for 16–18 hours with hot rolling at 150° F.

The following results were obtained.

17% Calcium Chloride Brine Mud

| | Example | | | | |
|---|---|---|---|---|---|
| | 24 | CE 20 | CE 21 | CE 22 | CE 23 |
| Fluid Loss Additive | Hemicellulose | Derivatized crosslinked corn starch | Pregelled potato starch | Pregelled corn starch | Non-pregelled corn starch |
| Additive Concentration (ppb) | 4.0 | 4.0 | 4.0 | 4.0 | 4.0 |
| PV | 22.0 | 16.5 | 25.0 | 15.0 | 14.0 |
| YP | 12.0 | 26.0 | 26.0 | 18.0 | 50.0 |
| GEL | 7.0 | 8.0 | 6.5 | 4.0 | 14.0 |
| Fluid Loss | 5.0 | 8.2 | 5.0 | 6.7 | 9.1 |

It is thus been that the foregoing solution provided excellent fluid loss control properties as compared with the comparative examples.

Example 25 and Comparative Example 24

A corn hull hemicellulose containing material was prepared by extrusion-looking corn hulls from a wet milling process with NaOH in a Wenger TX-57 Twin Screw Extruder according to the following conditions:
Extruder speed=208 rpm
Feed Rate=145 pounds per hour
50% NaOH=216 milliliters per minute
Steam=4 pounds per hour
Water=15 pounds per hour
Barrel #1 Temperature=111° F.

Barrel #2 Temperature=240° F.
Barrel #3 Temperature=332° F.
Barrel #4 Temperature=332° F.
Barrel #5 Temperature=270° F.

The extruded product was dried in a moving grate drier and ground into a coarse powder. The resulting coarsely ground dried extrudate was formulated into an adhesive paste by mixing 15 parts by weight coarsely ground extruder product with 85 parts water. The hemicellulose containing material was evaluated in 17% calcium chloride brine in the same manner as in Example 24. For comparison, a commercial starch was evaluated.

The following results were obtained.

| 17% Calcium Chloride Brine Mud | | |
|---|---|---|
| Example | 25 | CE 24 |
| Fluid Loss Additive | Hemicellulose containing Product | Commercial Derivatized Crosslinked Corn Starch |
| Additive Concentration (ppb) | 4.0 | 4.0 |
| PV | 10.0 | 16.5 |
| YP | 29.0 | 26.0 |
| GEL | 5.0 | 8.0 |
| Fluid Loss | 7.2 | 8.2 |

It is thus been that satisfactory fluid loss properties were afforded by the hemicellulose-containing product. The hemicellulose-containing product is more economical than the purer hemicellulose of Example 24.

Example 26 and Comparative Example 25

The hemicellulose-containing product prepared in accordance with Example 25 was evaluated in saturated salt mud (NaCl) prepared by procedures in American Petroleum Institute's Recommended Practice 13B-1. The mud had the following formulation:

| Saturated NaCl | 280 ml |
|---|---|
| Attapulgite Clay | 4 g |
| Bentonite | 4 g |
| Hemicellulose-Containing Product | Varied |

Commercial derivatized starch was evaluated as a control (comparative Example 25). The moods were rolled for 16 hours at 176° F. The following results were obtained.

| | Example | | | |
|---|---|---|---|---|
| | 26a | 26b | 26c | CE 25 |
| Additive Concentration (ppb) | 4.0 | 6.0 | 8.0 | 4.0 |
| PV | 7.0 | 10.0 | 15.0 | 7.0 |
| YP | 0.5 | 2.5 | 1.0 | 2.0 |
| GEL | 1.5 | 3.0 | 3.0 | 1.0 |
| Fluid Loss | 12.5 | 7.5 | 5.0 | 6.0 |

Again, the fluid loss properties of this product were satisfactory as compared with the control.

Example 27

Corn hulls were treated with sodium hydroxide and sodium chloracetate to prepare carboxymethyl corn hulls. The following mixture was prepared in a Hobart mixer and then extruded in a Leistritz Micro 18 mm extruder according to the conditions set forth below. To prepare the mixture, crude hulls and sodium chloroacetate were dry blended, and then the combined amount of water and 50% NaOH drizzled into the mixer. The amount of water added resulted in a water content of about 30% in the extruder feed.

The mixture had the following formulation:

| Crude Corn Hulls | 1000 g (942.7 g dry basis) |
|---|---|
| Sodium Chloracetate | 64.8 g |
| 50% NaOH | 246.7 g |
| Water | 360 g |

A portion of the extrudate was oven-dried at 100° C. overnight and then pulverized in a UDY mill. Upon analysis, it was seen that the hulls contained 3.03% bound carboxyl.

The extrusion conditions were as follows:

| Extruder Shaft Speed rpm | 100 |
|---|---|
| Extruder Motor Load % | 25 |
| 1$^{st}$ Head Temp | 70° C. |
| 2$^{nd}$ Head Temp | 80° C. |
| 3$^{rd}$ Head Temp | 90° C. |
| 4$^{th}$ Head Temp | 100° C. |
| 5$^{th}$ Head Temp | 100° C. |
| 6$^{th}$ Head Temp | 100° C. |
| Die Hole size | 3.175 mm |
| Number of Die Holes | 1 hole |
| Die Pressure | 80 psi |

Comparative Example 26

Under the same conditions as in Example 26, a mixture of 1000 g crude corn hulls (942.7 g dry basis), 200 g 50% sodium hydroxide, and 360 g water was extruded, and the extrudate was dried and pulverized. The extrudate contained 1.33% bound carboxyl.

Example 28 and Comparative Examples 27 and 28

Drilling fluids were formulated as follows:

| Saturated NaCl | 280 ml |
|---|---|
| Attapulgite Clay | 4 g |
| Gold Seal Bentonite | 4 g |
| Fluid Loss Control Agent | 4 g |

For Example 28, the fluid loss control agent was the carboxyalkylated corn hull hemicellulose product of Example 27. For Comparative Example 27, the fluid loss control agent was the alkali extruded corn hull product of Comparative Example 26. For Comparative Example 28, the fluid loss control agent was FILTER-CHEK®, a carboxymethyl starch sold by Baroid Drilling Fluids, Inc.

In separate experiments, the drilling fluids were aged in for 16 hours at 70° F., 178° F., 250° F., and 225° F., and then evaluated. The following results were obtained

| | 70° F. | | |
|---|---|---|---|
| Drilling Fluid | Example 28 | CE 27 | CE 28 |
| Rheological Properties (@ 70° F.) | | | |
| 600 RPM | 13 | 12 | 17.5 |
| 300 RPM | 7 | 7 | 11 |
| 200 RPM | 6 | 4 | 7 |
| 100 RPM | 3 | 3 | 4 |
| 6 RPM | 1 | 0.5 | 1 |
| 3 RPM | 0.5 | 0.25 | 0.5 |
| Plastic Viscosity (Cp) | 6 | 5 | 6.5 |
| Yield Point (lb/100 ft$^2$) | 1 | 2 | 4.5 |
| 10 Sec Gel Strength (lb/100 ft$^2$) | 3 | 1.5 | 1.5 |
| API 30 Min Fluid Loss (ml) | 8.5 | 8.5 | 6.5 |
| Spurt Loss (ml) | 0 | 0 | 0 |
| Filter Cake (1/32) | <1 | 1 | <1 |

| | 178° F. | | |
|---|---|---|---|
| Drilling Fluid | Example 28 | CE 27 | CE 28 |
| Rheological Properties (@ 70° F.) | | | |
| 600 RPM | 13 | 12 | 16 |
| 300 RPM | 7 | 6 | 9 |
| 200 RPM | 5 | 4 | 6.5 |
| 100 RPM | 3 | 2 | 4 |
| 6 RPM | 1 | 1 | 1 |
| 3 RPM | 0.5 | 0.5 | 0.5 |
| Plastic Viscosity (Cp) | 6 | 6 | 7 |
| Yield Point (lb/100 ft$^2$) | 1 | 0 | 2 |
| 10 Sec GEL strength (lb/100 ft$^2$) | 1 | 1 | 1 |
| API 30 Min Fluid Loss (ml) | 8.2 | 15 | 6 |
| Spurt Loss (ml) | 0 | 1 | 0 |
| Filter Cake (1/32) | <1 | 2 | <1 |

| | 250° F. | | |
|---|---|---|---|
| Drilling Fluid | Example 28 | CE 27 | CE 28 |
| Rheological Properties (@ 70° F.) | | | |
| 600 RPM | 13 | | 10 |
| 300 RPM | 7 | | 5 |
| 200 RPM | 6 | | 3.5 |
| 100 RPM | 3 | | 2 |
| 6 RPM | 1 | | 1 |
| 3 RPM | 0.5 | | 0.5 |
| Plastic Viscosity (Cp) | 6 | | 5 |
| Yield Point (lb/100 ft$^2$) | 1 | | 0 |
| 10 Sec Gel Strength (lb/100 ft$^2$) | 1 | | 1.5 |
| API 30 Min Fluid Loss (ml) | 10.2 | | 48 |
| Spurt Loss (ml) | 3 | | 7 |
| Filter Cake (1/32) | <1 | | 5 |

| | 275° F. | | |
|---|---|---|---|
| Drilling Fluid | Example 28 | CE 28 | CE 28 |
| Rheological Properties (@ 70° F.) | | | |
| 600 RPM | 12.5 | | 11 |
| 300 RPM | 7.5 | | 6.5 |
| 200 RPM | 4.5 | | 4 |
| 100 RPM | 2.5 | | 2.5 |
| 6 RPM | 1 | | 1 |
| 3 RPM | 0.5 | | 0.1 |
| Plastic Viscosity (Cp) | 5 | | 4.5 |
| Yield Point (lb/100 ft$^2$) | 2.5 | | 2 |
| 10 Sec GEL Strength (lb/100 ft$^2$) | 1.5 | | 1.5 |
| API 30 Min Fluid Loss (ml) | 28.4 | | 93.5 |
| Spurt Loss (ml) | 7 | | 13 |
| Filter Cake (1/32) | 2 | | 5 |

It is thus seen that the carboxyalkylated corn hulls of the invention provided excellent fluid loss control properties, and that these properties improved relative to the control as the temperature increased.

Example 29 and Comparative Examples 29–32

Corn hull hemicellulose and cellulose were obtained via the procedure set forth in U.S. Pat. No. 4,038,481, Example 1. A slurry of 30 g corn hull hemicellulose (5% moisture) in 800 ml 2-propanol was stirred while 80 ml of 30% NaOH was added at room temperature. Chloroacetic acid, 36 g, was added over 30 minutes with stirring.

Sixteen hours later, the solid material was separated from the liquid. The recovered solid material was agitated in a blender in 1 liter 70% methanol. The liquid (which contained impurities) was decanted from the insolubles, and the insolubles were agitated in a blender in 1-liter absolute methanol. The solid was retrieved from the liquid via screening and dried overnight in a forced air over at 100° C. The dry product was then ground to a powder to yield carboxymethyl hemicellulose. In the same manner, carboxymethyl corn hull cellulose was prepared.

Drilling fluids were prepared from the carboxymethyl cellulose and hemicellulose prepared in accordance with the foregoing procedures by combining 280 ml saturated NaCl solution, 4 g Attapulgite clay, and 4 g Gold Seal bentonite with 4 g of the carboxymethyl hemicellulose or carboxymethyl cellulose (these representing Comparative Examples 29 and 30 respectively). These drilling fluids and the drilling fluid of Example 28 (which had a similar formulation but which was prepared using carboxymethyl corn hulls) were aged at 70° F. for 16 hours (the aged drilling fluid representing Example 29), and the fluid properties of the fluids were evaluated. The following results were obtained.

| Drilling Fluid | Example 29 | CE 29 | CE 30 |
|---|---|---|---|
| RHEOLOGICAL PROPERTIES (@ 70° F.) | | | |
| 600 RPM | 13 | 12 | 61 |
| 300 RPM | 7 | 6.5 | 33 |

-continued

| Drilling Fluid | Example 29 | CE 29 | CE 30 |
|---|---|---|---|
| 200 RPM | 6 | 4 | 24.5 |
| 100 RPM | 3 | 3 | 13.5 |
| 6 RPM | 1 | 1 | 2 |
| 3 RPM | 0.5 | 0.5 | 1 |
| Plastic Viscosity (Cp) | 6 | 5.5 | 28 |
| Yield Point (lb/100 ft$^2$) | 1 | 1 | 5 |
| 10 Sec Gel Strength (lb/100 ft$^2$) | 3 | 1.5 | 3 |
| API 30 MIN Fluid Loss (ml) | 8.5 | 17.6 | 4 |
| Spurt Loss (ml) | 0 | 0.5 | 0 |
| Filter Cake (1/32) | <1 | 3 | <1 |

In another experiment, samples of the drilling fluids were aged for 16 hours at 250° F. Drilling fluids of otherwise identical composition were further prepared using DRISCOSE LV and DRISCOSE (regular) in place of the carboxyalkyl cellulose or hemicellulose. The DRISCOSE products are high-purity commercial carboxymethyl cellulose products (these representing Comparative Examples 31 and 32 respectively). These drilling fluids also were aged for 16 hours at 250° F. The properties of the aged drilling fluids are set forth below.

| Drilling Fluid | CE 29 | CE 30 | CE 31 | CE 32 |
|---|---|---|---|---|
| RHEOLOGICAL PROPERTIES (70° F.) | | | | |
| 600 RPM | 10.0 | 14.5 | 33.5 | 24 |
| 300 RPM | 5.5 | 8.0 | 18 | 12 |
| 200 RPM | 4.0 | 5.5 | 12 | 8.5 |
| 100 RPM | 3.0 | 3.5 | 8.0 | 5.5 |
| 6 RPM | 1.0 | 1.5 | 1.5 | 1.5 |
| 3 RPM | 0.5 | 1.0 | 1.0 | 1.0 |
| PLASTIC VISCOSITY (Cp) | 4.5 | 6.5 | 15.5 | 12 |
| YIELD POINT (lb/100 ft$^2$) | 1.0 | 1.5 | 2.5 | 0 |
| 10 SEC GEL STRENGTH (lb/100 ft$^2$) | 1.5 | 1.5 | 2.0 | 1.5 |
| APL 30 MIN FLUID LOSS (ml) | 252 | 10.8 | 4.0 | 4.5 |
| SPURT LOSS (ml) | 45 | 2.0 | 0 | 0 |
| FILTER CAKE (1/32) | 8 | 1 | >1 | >1 |

It is thus seen that the cellulose fraction did not perform as well as the carboxyalkyl corn hulls of Example 28, thus indicating that the other components of the corn hulls were effective in enhancing the carboxyalkyl cellulose. This result is surprising, particularly since the hemicellulose fraction, by itself, preformed poorly upon aging at an elevated temperature.

Thus, the foregoing general objects have been satisfied. The invention provides a drilling fluid that is suitable for use in connection with borehole drilling. The invention further provides a drilling apparatus and method that incorporated the improved drilling fluid.

While particular embodiments of the invention have been shown, it will be understood that the invention is not limited thereto since modifications may be made by those skilled in the art, particularly in light of the foregoing teachings. For instance, the pH or salt content of the disclosed fluids may be modified, or, more generally, other components may be altered. It is therefore contemplated that the invention encompasses the subject matter of the following claims and equivalents thereof as permitted by applicable law. All references cited herein are hereby incorporated by reference in their entireties. No non-claimed language should be regarded as limiting the scope of the claimed invention. The term "an effective amount" and like terms should not be construed to exclude greater than the minimum effective amount.

What is claimed is:

1. A drilling fluid comprising:
    a liquid base selected from the group consisting of water, water-miscible liquids, and mixtures thereof;
    an alkyl glycoside, said alkyl glycoside being present in an amount effective to inhibit shale swelling and being selected from among the α-form, the β-form, and mixtures thereof, said alkyl glycoside selected from among the methyl, ethyl, propyl, and butyl glycosides of glucose, maltose, maltotriose, and maltotetraose; and
    carboxyalkylated corn hulls, said carboxyalkylated corn hulls being selected from the group consisting of carboxymethyl, carboxyethyl, carboxypropyl, and carboxybutyl corn hulls, said carboxyalkylated corn hulls being present in said drilling fluid in an amount effective to inhibit loss of said drilling fluid into a wellbore formation.

2. A drilling fluid according to claim 1, wherein said alkyl glycoside comprises methyl glucoside.

3. A drilling fluid according to claim 1, wherein said carboxyalkylated corn hulls comprise carboxymethyl corn hulls.

4. A drilling fluid according to claim 1, said drilling fluid further including a maltodextrin, said maltodextrin being present in an amount effective to inhibit shale swelling.

5. A drilling fluid according to claim 1, said drilling fluid further including a carboxyalkyl starch, said carboxyalkyl starch being present in an amount effective to inhibit shale swelling.

6. A drilling fluid according to claim 1, said drilling fluid further including hemicellulose, said hemicellulose being present in an amount effective to inhibit shale swelling.

7. A drilling apparatus comprising:
    a drill string;
    at least one pump for circulating a drilling fluid through at least a portion of said drill string, said pump being fluidically connected to a source of a drilling fluid, said drilling fluid comprising:
    a liquid base selected from the group consisting of water, water-miscible liquids, and mixtures thereof;
    carboxyalkylated corn hulls, said carboxyalkylated corn hulls being selected from the group consisting of carboxymethyl, carboxyethyl, carboxypropyl, and carboxybutyl corn hulls, said carboxyalkylated corn hulls being present in said drilling fluid in an amount effective to inhibit loss of said drilling fluid into a wellbore formation.

8. An apparatus according to claim 7, said drilling fluid comprising:
    an alkylglycoside an alkyl glycoside, said alkyl glycoside being present in an amount effective to inhibit shale swelling and being selected from among the α-form, the β-form, and mixtures thereof, said alkyl glycoside selected from among the methyl, ethyl, propyl, and butyl glycosides of glucose, maltose, maltotriose, and maltotetraose.

9. An apparatus according to claim 8, said alkyl glycoside comprising methyl glucoside.

10. An apparatus according to claim 7, wherein said carboxyalkylated corn hulls comprise carboxymethyl corn hulls.

11. An apparatus according to claim 7, said drilling fluid further including a maltodextrin, said maltodextrin being present in an amount effective to inhibit shale swelling.

12. An apparatus according to claim 7, said drilling fluid further including a carboxyalkyl starch, said carboxyalkyl starch being present in an amount effective to inhibit shale swelling.

13. An apparatus according to claim 7, said drilling fluid further including hemicellulose, said hemicellulose being present in an amount effective to inhibit shale swelling.

14. An apparatus according to claim 7, said drilling fluid including a maltodextrin and hemicellulose.

15. A drilling process comprising circulating a drilling fluid through a drill string, said drilling fluid comprising:
   a liquid base selected from the group consisting of water, water-miscible liquids, and mixtures thereof;
   carboxyalkylated corn hulls, said carboxyalkylated corn hulls being selected from the group consisting of carboxymethyl, carboxyethyl, carboxypropyl, and carboxybutyl corn hulls, said carboxyalkylated corn hulls being present in said drilling fluid in an amount effective to inhibit loss of said drilling fluid into a wellbore formation.

16. A process according to claim 15, said drilling fluid being circulated through a drill string as a wellbore is being dug into the earth.

17. A process according to claim 15, said drilling fluid comprising:
   an alkyl glycoside, said alkyl glycoside being present in an amount effective to inhibit shale swelling and being selected from among the α-form, the β-form, and mixtures thereof, said alkyl glycoside selected from among the methyl, ethyl, propyl, and butyl glycosides of glucose, maltose, maltotriose, and maltotetraose.

18. A process according to claim 17, said alkyl glycoside comprising methyl glucoside.

19. A process according to claim 18, wherein said carboxyalkylated corn hulls comprise carboxymethyl corn hulls.

20. A process according to claim 17, said drilling fluid further including a maltodextrin, and maltodextrin being present in an amount effective to inhibit shale swelling.

21. A process according to claim 17, said drilling fluid further including a carboxyalkyl starch, said carboxyalkyl starch being present in an amount effective to inhibit shale swelling.

22. A process according to claim 17, said drilling fluid further including hemicellulose, said hemicellulose being present in an amount effective to inhibit shale swelling.

23. A drilling fluid according to claim 1, further comprising molasses solids, said molasses solids being present in an amount effective to inhibit shale swelling.

24. A drilling fluid according to claim 23 wherein the molasses solids comprise desugared sugar beet molasses solids.

25. The drilling fluid of claim 23 wherein the alkyl glucoside is methyl glucoside; and the carboxyalkylated corn hulls comprise carboxymethyl corn hulls.

26. A drilling fluid according to claim 25 wherein the molasses solids comprise desugared sugar beet molasses solids.

27. A drilling fluid according to claim 2 wherein the methyl glucoside is present in a ratio of approximately 2:1 of α:βisomers.

28. A drilling apparatus according to claim 7 wherein the drilling fluid further comprises molasses solids, said molasses solids being present in an amount effective to inhibit shale swelling.

29. A drilling fluid according to claim 28 wherein the molasses solids comprise desugared sugar beet molasses solids.

30. A drilling apparatus according to claim 8 wherein the drilling fluid further comprises molasses solids, said molasses solids being present in an amount effective to inhibit shale swelling.

31. A drilling apparatus according to claim 30 wherein the molasses solids comprise desugared sugar beet molasses solids.

32. A drilling apparatus according to claim 9 wherein the methyl glucoside is present in a ratio of approximately 2:1 of α:βisomers.

33. A drilling process according to claim 15 wherein the drilling fluid further comprises molasses solids, said molasses solids being present in an amount effective to inhibit shale swelling.

34. A drilling process according to claim 33 wherein the molasses solids comprise desugared sugar beet molasses solids.

35. A drilling process according to claim 17 wherein the drilling fluid further comprises molasses solids, said molasses solids being present in an amount effective to inhibit shale swelling.

36. A drilling process according to claim 35 wherein the molasses solids comprise desugared sugar beet molasses solids.

37. A drilling process according to claim 18 wherein the methyl glucoside is present in a ratio of approximately 2:1 of α:βisomers.

38. A drilling process comprising circulating a drilling fluid through a drill string, said drilling fluid comprising:
   a liquid base selected from the group consisting of water, water-miscible liquids, and mixtures thereof;
   molasses solids, said molasses solids being present in an amount effective to inhibit shale swelling; and
   a carboxyalkylated agricultural residue, said agricultural residue containing hemicellulose and cellulose, said residue being selected from the group consisting of carboxymethyl, carboxyethyl, carboxypropyl, and carboxybutyl substituted residue, said residue being present in said drilling fluid in an amount effective to inhibit loss of said drilling fluid into a wellbore formation.

39. A drilling process according to claim 38 wherein the molasses solids comprise desugared sugar beet molasses solids.

40. A drilling apparatus comprising;
   a drill string;
   at least one pump for circulating a drilling fluid through at least a portion of said drill string, said pump being fluidically connected to a source of a drilling fluid, said drilling fluid comprising:
   a liquid base selected from the group consisting of water, water-miscible liquids, and mixtures thereof;
   molasses solids, said molasses solids being present in an amount effective to inhibit shale swelling; and
   a carboxyalkylated agricultural residue, said agricultural residue containing hemicellulose and cellulose, said residue being selected from the group consisting of carboxymethyl, carboxyethtl, carboxypropyl, and carboxybutyl substituted residue, said residue being present in said drilling fluid in an amount effective to inhibit loss of said drilling fluid into a wellbore formation.

41. A drilling apparatus according to claim 40, wherein the molasses solids comprise desugared sugar beet molasses solids.

42. A drilling process comprising circulating a drilling fluid through a drill string, said drilling fluid comprising:
 a liquid base selected from the group consisting of water, water-miscible liquids, and mixtures thereof;
 molasses solids, said molasses solids being present in an amount effective to inhibit shale swelling; and
 a carboxyalkylated agricultural residue, said agricultural residue containing hemicellulose and cellulose, said residue being selected from the group consisting of carboxymethyl, carboxyethyl, carboxypropyl, and carboxybutyl substituted residue, said residue being present in said drilling fluid in an amount effective to inhibit loss of said drilling fluid into a wellbore formation, wherein said drilling fluid is exposed to a temperature of at least 150° F. for at least 5 hours.

43. A drilling process according to claim 42, wherein the molasses solids comprise desugared sugar beet molasses solids.

* * * * *